United States Patent
Tsengas

(10) Patent No.: US 6,838,097 B1
(45) Date of Patent: Jan. 4, 2005

(54) PET FOOD PRODUCT

(76) Inventor: Stephen Tsengas, 1300 East St., Fairport Harbor, OH (US) 44077

( * ) Notice: Subject to any disclaimer, the term of this patent is extended or adjusted under 35 U.S.C. 154(b) by 353 days.

(21) Appl. No.: 10/179,117

(22) Filed: Jun. 25, 2002

Related U.S. Application Data

(60) Provisional application No. 60/340,627, filed on Dec. 14, 2001.

(51) Int. Cl.[7] ................................................ A01K 1/00
(52) U.S. Cl. .............................. 426/2; 426/72; 426/74; 426/61; 426/34; 426/573; 426/601; 426/650; 426/638; 426/658; 426/654; 426/805
(58) Field of Search ................................ 426/2, 34, 61, 426/72, 74, 573, 601, 638, 650, 654, 658, 805

(56) References Cited

U.S. PATENT DOCUMENTS

| | | | |
|---|---|---|---|
| 4,169,162 A | | 9/1979 | Appleman .................... 426/98 |
| 4,217,370 A | | 8/1980 | Rawlings et al. ............ 426/335 |
| 4,713,250 A | * | 12/1987 | Tonyes et al. .................. 426/2 |
| 5,141,755 A | * | 8/1992 | Weisman ....................... 426/42 |
| 5,945,152 A | | 8/1999 | Purser .......................... 426/646 |
| 5,952,033 A | * | 9/1999 | Anantharaman et al. ..... 426/615 |
| 5,968,569 A | * | 10/1999 | Cavadini et al. ............... 426/61 |
| 6,277,434 B1 | * | 8/2001 | Matluk-Boisseau ......... 426/635 |
| 6,379,738 B1 | * | 4/2002 | Dingman et al. ............ 426/646 |
| 6,440,485 B1 | * | 8/2002 | Cheuk et al. ................ 426/646 |
| 6,488,970 B1 | * | 12/2002 | Hora ............................. 426/72 |

FOREIGN PATENT DOCUMENTS

WO    01/21008 A2 *  3/2001

* cited by examiner

Primary Examiner—C. Sayala
(74) Attorney, Agent, or Firm—John D. Gugliotta; P. Jeff Martin

(57) ABSTRACT

A pet food product is provided which is served to pets at either room temperature as a pudding or frozen, comparable to ice cream. The pet food product includes a combination of natural ingredients to an emulsion of vegetable oil, glycerin, and milk solids to provide a healthy treat for pets, such as dogs and cats.

17 Claims, No Drawings

PET FOOD PRODUCT

RELATED APPLICATIONS

The present invention is a conversion of a U.S. Provisional Patent Application, Ser. No. 60/340,627 filed on Dec. 14, 2001.

BACKGROUND OF THE INVENTION

1. Field of the Invention

The present invention relates generally to pet food products and, more particularly, to a pet food treat that is nutritious and pleasant tasting for a pet, and which is versatile in that it can be served at room temperature or frozen.

2. Description of the Related Art

It has long been known that animals kept as pets enjoy tasty treats as much as their human caretakers. Pets like pleasant tasting additions to their regular meals. Pets also enjoy a cold treat on a hot day.

Pet owners often give treats to their pets. Many times, these are treats specifically designed for pets. But, often pet owners give their pets "people-food", such as ice cream. Although a pet may enjoy eating the ice cream or other sweet food, such treats are not healthy for pets and may cause intestinal disturbances or other discomforts or illness for pets.

Some manufacturers of pet products have developed ice-cream like treats for pets. These treats are typically purchased in their frozen form and must be kept frozen until it is fed to the pet. Other pet food products, such as the product described in U.S. Pat. No. 6,277,434, may be transported at room temperature, but must be frozen before giving it to the pet.

Accordingly, a need has arisen for a means by which to provide pets with a nutritious and tasteful food treat which can be served either at room temperature or in a frozen state. The development of the pet food product fulfills this need.

A search of the prior art did not disclose any patents that read directly on the claims of the instant invention; however, the following references were considered related.

U.S. Pat. No. 4,169,162 issued in the name of Appleman discloses a soft-moist, heat treated, environmentally stable animal food product.

U.S. Pat. No. 4,217,370 issued in the name of Rawlings et al. discloses foodstuffs and feed supplements containing microencapsulated lipids by solubilizing protein in the presence of an aqueous medium, admixing a lipid material so as to form an emulsion to its isoelectric point so as to aggregate the protein and simultaneously microencapsulate the lipid.

U.S. Pat. No. 6,277,434 B1 issued in the name of Matluk-Boisseau discloses pet food product and methods of product manufacture and distribution.

U.S. Pat. No. 5,945,152 issued in the name of Purser discloses a method of preparing a fully-cooked semi-moist shelf stable meat product.

Consequently, a need has been felt for providing a nutritious and tasteful food treat for pets which can be served either at room temperature or frozen in a manner which is quick, easy, and efficient.

SUMMARY OF THE INVENTION

Therefore, it is an object of the present invention to provide a pet food product presentable as a frozen treat or as a room temperature-pudding.

It is another object of the present invention to provide a pet food product formed as an emulsion.

It is another object of the present invention to provide a nutritious food product for pets.

It is another object of the present invention to provide a nutritious food product for pets which is pleasant tasting.

It is another object of the present invention to provide a pleasant tasting and nutritious pet food product which does not cause intestinal disturbances or other discomforts or illnesses for pets.

Briefly described according to one embodiment of the present invention, a unique pet food product is provided which is nutritious and pleasant tasting for a pet, and which may be served at room temperature or frozen. The pet food product includes a combination of natural ingredients and is formed as an emulsion, and as such, is presented to pets as a pudding or may be frozen and served as a frozen treat.

An advantage of the present invention is that it can be shelf-stored for an extended period, and doesn't require refrigeration until seal is broken on packaging cup.

Another advantage of the present invention is that it can be frozen and served as a frozen treat, but does not require being frozen before serving.

The use of the present invention allows pets to enjoy a nutritious and tasteful food treat which can be served either at room temperature or frozen, and which does not cause intestinal disturbances, in a manner which is quick, easy, and efficient.

DETAILED DESCRIPTION OF THE PREFERRED EMBODIMENT

A. Composition

A pet food product is provided, according to the present invention, comprised of a composition of one or more of the following ingredients: water; vegetable oil; sucrose; maltodextrins; modified corn starch; dried *lactobacillus acidophilus* fermentation solubles; dried *lactobacillus lactis* fermentation solubles; dried *lactobacillus casei* fermentation solubles; non-fat dried milk solids; glycerin; glucose; vegetable gums; vitamin A supplement; vitamin D3 supplement; vitamin E supplement; vitamin B12 supplement; riboflavin supplement (B2); niacin supplement (B3); calcium pantothenate (B5); menadione dimethylpyrimidinol bisulphite (K3); folic acid supplement; pyridoxine hydrochloride (B6); thiamin hydrochloride (B1); d-biotin; sorbic acid; potassium chloride; calcium carbonate; magnesium sulfate; potassium sorbate; natural flavoring; and natural preservative.

Each of the aforementioned ingredients may have one or more sub-components. For example, the natural preservative includes but is not limited to a mixture of tocopherols and rosemary extract.

Some of the ingredients solely add nutritional value to the composition. For example, potassium chloride, calcium carbonate, and magnesium sulfate add important minerals to the composition which facilitate the development and maintenance of strong, healthy bones, muscles and cartilage of one's pet. Primarily, all of the ingredients add a degree of nutritional value to the composition, with the exception of particular artificial flavorings. However, it is both known by those skilled in the relevant art and disclosed in the prior art that certain artificial or natural flavoring compositions (vanilla and mint) add nutritional value to a composition.

Other ingredients serve various other purposes. For example, sorbic acid functions as a preservative. Preservatives are critical to prevent fat spoilage or oxidation which facilitates a decrease in the nutritional quality of the pet food, and in turn, is less palatable to the dog.

Other preservatives are envisioned to be utilized in addition to, or in the alternative to sorbic acid. For example, glucono delta lactone (GDL) is a preservative which facilitates lowering of pH, thus preserving food from enzyme and microorganism deterioration. Potassium sorbate is yet another preservative utilized in the composition.

Modified corn starch is a bulking agent which serves to make the pet food product thick, or highly viscous in consistency.

Dried *lactobacillus acidophilus* fermentation solubles, dried *lactobacillus lactis* fermentation solubles and dried *lactobacillus casei* fermentation solubles are added to enhance the healthiness of flora (bacteria colony) in the small intestine.

Additionally, it is envisioned that an herbal blend is added to the composition, wherein herbal blend comprises one or more of the following components: barley grass, dandelion, alfalfa, turmeric, and chamomile.

B. Method

In practicing the present invention, the general method of manufacture includes mixing product ingredients so as to form an emulsion, thereby providing a consistency resembling "pudding" at room temperature. For purposes of this disclosure, the term "pudding" is defined herein as a highly viscous, creamy substance. The ingredients are then sealed within product packaging, wherein packaging comprises a plurality of disposable, packaging cups which are easily opened.

The specific method of use of the product, in view of being formed as an emulsion, is presentable as a treat to pets in a plurality of ways, including being served at room temperature as a pudding. Room temperature-pudding product is also ideal for other applications, including being mixed with a pet's regular pet food as a gravy in order to supplement flavor and/or to provide the regular pet food with a more appealing texture.

In order to serve the pet food product of the present invention as a frozen treat, an end consumer simply freezes the product and serves to pet.

An advantage of the present invention is that the pet food product does not require refrigeration until opened from its container, thus being shelf-storable for an extended period.

Dehydration relief is an additional advantage provided by the pet food product of the present invention. An active pet coupled with warm weather translates into increased water consumption by the pet. Being approximately 87% water composition by weight, the pet food product therefore provides dehydration relief.

The present invention features packaging and distributing the pet food product in a plurality of natural flavors, including vanilla and mint.

EXAMPLES

The following examples represent various combinations of ingredients of the present invention so as to further illustrate the pet food product thereof.

Example 1

This example sets forth the general formulation for the pet food product of the present invention.

| INGREDIENTS | Composition by Weight |
|---|---|
| Water | 65–89% |
| Vegetable Oils | 8–16% |
| Modified Corn Starch | 1–5% |
| Polysaccharides (Sugar/Starch Groups) | 1–11% |
| Emulsion (Glycerin/Milk Solids) | 0.1–9% |
| Vitamins | 0.1–5% |
| Composite Fermentation Product Solubles | 0.65–0.75% |
| Flavoring Agents | 0.1–7% |
| Minerals | 0.05–2% |
| Natural Preservatives | 0.10–5% |

Example 2

This example shows an alternative formulation for the pet food product of the present invention.

| INGREDIENTS | Composition by Weight |
|---|---|
| Water | 65–89% |
| Vegetable Oils | 8–16% |
| Modified Corn Starch | 1–5% |
| Polysaccharides (Sugar/Starch Groups) | 1–11% |
| Emulsion (Glycerin/Milk Solids) | 0.1–9% |
| Vitamins | 0.1–5% |
| Herbs | 0.25–0.35% |
| Composite Fermentation Product Solubles | 0.65–0.75% |
| Flavoring Agents | 0.1–7% |
| Minerals | 0.05–2% |
| Natural Preservatives | 0.10–5% |

Operation of the Preferred Embodiment

To use the present invention, the user simply serves the pet food product right out of its packaged cup or in a desired dish at room temperature as a pudding; optionally, user can mix the temperature-pudding product with the pet's regular pet food as a gravy.

In order to serve the pet food product of the present invention as a frozen treat, user simply freezes the product and serves to the pet.

The use of the present invention allows pets to enjoy a nutritious and tasteful food treat which can be served either at room temperature or frozen, and which does not cause intestinal disturbances in a manner which is quick, easy, and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A pet food emulsion composition comprising:
a combination of the following ingredients
water; vegetable oil; sucrose, maltodextrins, modified corn starch, dried *lactobacillus acidophilus* fermentation solubles, dried *lactobacillus lactis* fermentation solubles, dried *lactobacillus casei* fermentation solubles, non-fat dried milk solids, glycerin, glucose, vegetable gums, vitamin A supplement, vitamin D3 supplement, vitamin E supplement, vitamin B12 supplement, riboflavin supplement (B2), niacin supplement (B3), calcium pantothenate (B5), menadione dimethylpyrimidinol bisulphite (K3), folic acid supplement; pyridoxine hydrochloride (B6), thiamin hydrochloride (B1), d-biotin, sorbic acid, potassium chloride, calcium carbonate, magnesium sulfate, potassium sorbate, natural flavoring, and natural preservative.

2. The pet food emulsion composition of claim 1, wherein said ingredients includes:
65 percent to 89 percent water composition by weight;
8 percent to 16 percent vegetable oils composition by weight;
1 percent to 5 percent modified corn starch composition by weight;
1 percent to 11 percent-polysaccharides composition by weight;
0.1 percent to 9 percent emulsion composition by weight;
0.1 percent to 5 percent vitamins composition by weight;
0.65 percent to 0.75 percent composite fermentation product solubles composition by weight;
0.1 percent to 7 percent flavoring agents composition by weight;
0.05 percent to 2 percent minerals composition by weight; and
0.10 percent to 5 percent natural preservatives composition by weight.

3. The pet food emulsion composition of claim 1, wherein said natural preservative includes glucono delta lactone, and a mixture of tocopherols and rosemary extract.

4. The pet food emulsion composition of claim 1, wherein said natural flavoring is vanilla.

5. The pet food emulsion composition of claim 1, wherein said natural flavoring is mint.

6. A method of manufacturing said pet food emulsion composition of claim 1, comprising mixing product ingredients so as to form an emulsion, thereby providing a substance having a highly viscous, creamy consistency at room temperature.

7. A method of using the pet food emulsion composition of claim 1, comprising the steps of:
1) storing said pet food composition at ambient temperature for an extended time as desired; and
2) serving to pet at room temperature as a pudding, or as a gravy.

8. A method of using the pet food emulsion composition of claim 1, comprising the steps of:
1) storing said pet food composition at ambient temperature for an extended time as desired;
2) freezing said pet food composition; and
3) serving said pet food composition while frozen.

9. The pet food composition of claim 1, wherein said pet food composition is is sealed within product packaging, wherein said packaging comprises a plurality of disposable, packaging cups, and wherein said packaging cups being easily opened.

10. A pet food emulsion composition comprising:
a combination of the following ingredients
water; vegetable oil; sucrose, maltodextrins, modified corn starch, dried *lactobacillus acidophilus* fermentation solubles, dried *lactobacillus lactis* fermentation solubles, dried *lactobacillus casei* fermentation solubles, non-fat dried milk solids, glycerin, glucose, vegetable gums, vitamin A supplement, vitamin D3 supplement, vitamin E supplement, vitamin B12 supplement, riboflavin supplement (B2), niacin supplement (B3), calcium pantothenate (B5), menadione dimethylpyrimidinol bisulphite (K3), folic acid supplement; pyridoxine hydrochloride (B6), thiamin hydrochloride (B1), d-biotin, sorbic acid, potassium chloride, calcium carbonate, magnesium sulfate, potassium sorbate, natural flavoring, natural preservative, and an herbal blend.

11. The pet food emulsion composition of claim 10, wherein said ingredients includes:
65 percent to 89 percent water composition by weight;
8 percent to 16 percent vegetable oils composition by weight;
1 percent to 5 percent modified corn starch composition by weight;
1 percent to 11 percent polysaccharides composition by weight;
0.1 percent to 9 percent emulsion composition by weight;
0.1 percent to 5 percent vitamins composition by weight;
0.25 percent to 0.35 percent herbs composition by weight;
0.65 percent to 0.75 percent composite fermentation product solubles composition by weight;
0.1 percent to 7 percent flavoring agents composition by weight;
0.05 percent to 2 percent minerals composition by weight; and
0.10 percent to 5 percent natural preservatives composition by weight.

12. The pet food emulsion composition of claim 10, wherein said natural preservative includes glucono delta lactone, and a mixture of tocopherols and rosemary extract.

13. The pet food emulsion composition of claim 10, wherein said natural flavoring is vanilla.

14. The pet food emulsion composition of claim 10, wherein said natural flavoring is mint.

15. A method of manufacturing said pet food emulsion composition of claim 10, comprising mixing product ingredients so as to form an emulsion, thereby providing a substance having a highly viscous, creamy consistency at room temperature.

16. A method of using the pet food emulsion composition of claim 10, comprising the steps of:
1) storing said pet food composition at ambient temperature for an extended time as desired; and
2) serving to pet at room temperature as a pudding, or as a gravy.

17. A method of using the pet food emulsion composition of claim 10, comprising the steps of:
1) storing said pet food composition at ambient temperature for an extended time as desired;
2) freezing said pet food composition; and
3) serving said pet food composition while frozen.

* * * * *